United States Patent [19]

Guers et al.

[11] 4,264,141

[45] Apr. 28, 1981

[54] METHOD AND ARRANGEMENT OF APPARATUS FOR FREQUENCY SHIFTING A MONOCHROMATIC NARROW BANDWIDTH LIGHT BEAM

[75] Inventors: Karl Guers, Eschborn; Joerg Boscher, Liederbach, both of Fed. Rep. of Germany

[73] Assignee: Battelle-Institut e.V., Frankfurt am Main, Fed. Rep. of Germany

[21] Appl. No.: 20,833

[22] Filed: Mar. 15, 1979

[30] Foreign Application Priority Data

Mar. 16, 1978 [DE] Fed. Rep. of Germany ....... 2811411

[51] Int. Cl.$^2$ ............................................. G02B 27/00
[52] U.S. Cl. .................................. 350/486; 350/294; 350/299; 350/320
[58] Field of Search ................ 350/6.5, 285, 294, 299, 350/320, 321

[56] References Cited

PUBLICATIONS

Bahrmann, J. et al., *Optics Communications,* vol. 22, No. 3, Sep. 1977, pp. 365–368.
Manuccia, T. J., "CW IR Laser . . . ", *Laser in Chemistry,* Elsevier Sci. Pub. Co., 1977, p. 210–215.
Grau., V G., *Laser,* Kleen/Muller, 1969, pp. 49–86.
Manuccia, T. J., *Laser Focus,* vol. 13, No. 8, Aug. 1977, pp. 28–29.

*Primary Examiner*—Jon W. Henry
*Attorney, Agent, or Firm*—Fisher, Christen & Sabol

[57] ABSTRACT

Arrangement for frequency shifting a monochromatic narrow-bandwidth light beam, in particular a laser beam, based upon the Doppler effect due to reflection from moving mirrors. Two stationary mirrors are provided between which the beam is reflected back and forth via two moving mirrors. The moving mirrors are staggered by an angle of 180°, arranged symmetrically on a rotating support and rotated about a common axis of rotation.

26 Claims, 3 Drawing Figures

FIG 1
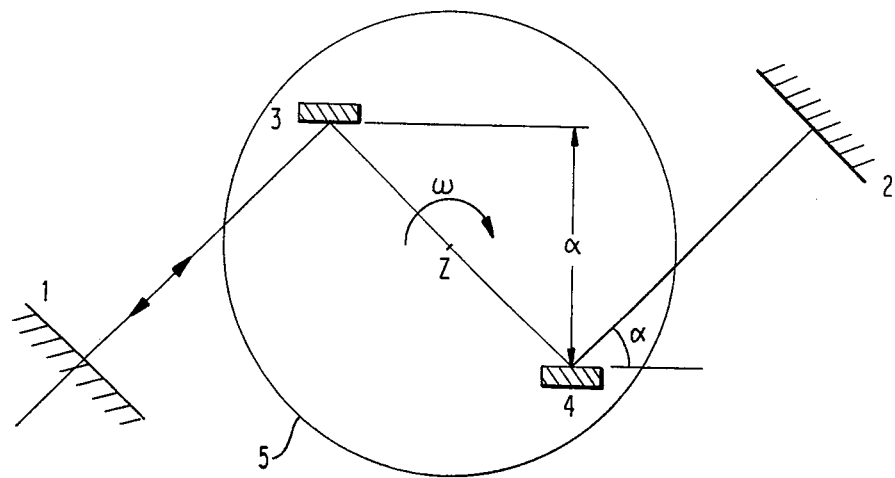
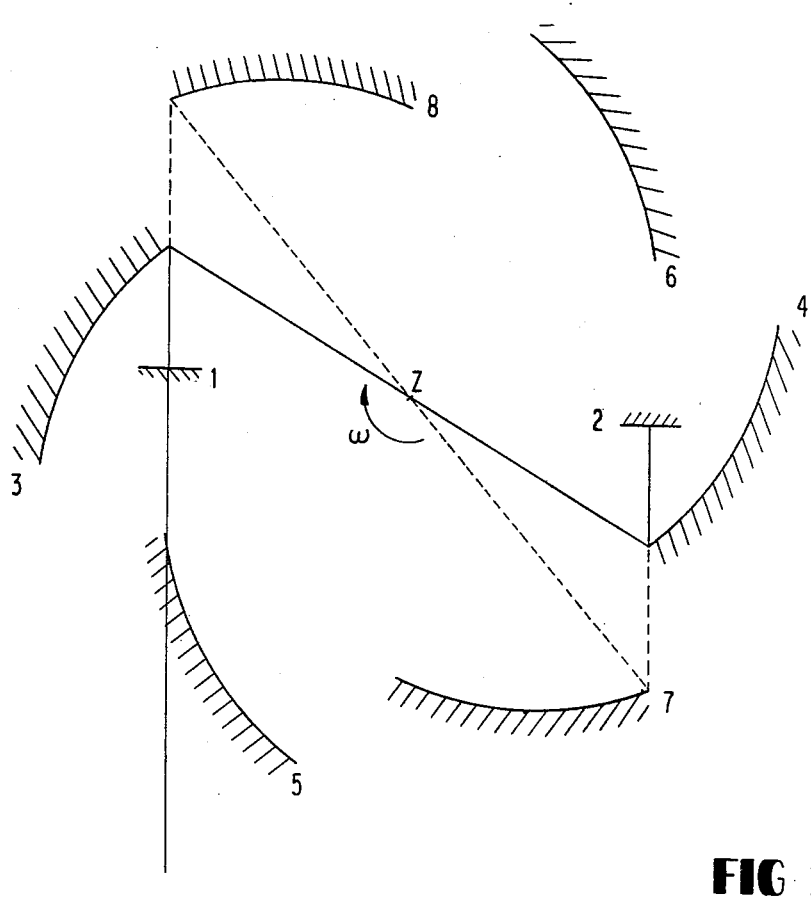
FIG 2

METHOD AND ARRANGEMENT OF APPARATUS FOR FREQUENCY SHIFTING A MONOCHROMATIC NARROW BANDWIDTH LIGHT BEAM

BACKGROUND OF THIS INVENTION

1. Field of This Invention

This invention relates to a method and an arrangement of apparatus to shift the frequency of a monochromatic light beam, especially a laser beam, by means of the principle of the Doppler effect using reflection from moving mirrors. In particular, the apparatus arrangement represents a mechanical laser frequency converter with wide frequency sweep.

For numerous applications (e.g., spectroscopy, photochemistry, and isotope separation) radiation of a defined wavelength is required. There are certain spectral regions where tunable radiation is available from appropriate lasers, for example, dye-lasers. In some cases tuning can be a effected by using non-linear optical effects such as induced Raman scattering and parametric oscillators. In other spectral regions such tunability does not exist or the tuning range is too small.

It is known that a frequency shift occurs when light is reflected from a single mirror moving in any direction except parallel to its surface. However, any other steady movement of the mirror also changes the beam direction or leads to a parallel displacement of the beam.

Furthermore, there is a known apparatus arrangement taking advantage of the Doppler effect in which the laser beam is directed into a defined resonator by means of two or three mirrors. After a certain number of reflections and beam leaves the resonator traversing a similar system of mirrors. In such case the resonator consists of a flat mirror located at the periphery of a rotating circular cylinder and a spiral reflecting cylinder having the shape of the involute of the circular cylinder (see T. J. Manuccia, "CW IR Laser Induced Chemistry, Isotope Separation and Related Laser Technology at NRL", in "Laser in Chemistry", Michael A. West (ed.), Elsevier Scientific Publishing Company, Amsterdam, (1977), pages 210–215). Manuccia proposed the use of such an apparatus arrangement for the very important application of isotope separation by tuning the wavelength of available lasers to the most favorable absorption frequency.

Taking a displacement in the spiral of $\pi \cdot 20$ cm, 60,000 rpm and 20 successive resonator passages of the same beam as the basis, the frequency shift amounts to 2.5 GHz at 10 $\mu$m.

To that extent such known arrangement could meet the experimental requirements, according to absorption wavelength and available lasers. However, there are considerable drawbacks from a technical point of view. A diameter of the inner cylinder of 20 cm (displacement of the spiral $\pi \cdot 20$ cm) implies an outside diameter of the spiral cylinder of 1 m and a weight of 1 to 2 tons. Therefore, the system is heavy, bulky and awkward to use. The spiral reflector can only, if at all, be produced with the necessary precision at the expense of very high costs.

In addition, it has been shown and experimentally investigated that a Doppler effect occurs if an echelon grating instead of a mirror is moved along its surface [J. Bahrmann, K. R. Detring, and G. Simonsohn, "Optics Communications" 22, 3 (1977), pp. 365–368]. However, a grating exhibits comparatively large reflection losses resulting in only a small number of reflections and thus a relatively low overall effect.

BROAD DESCRIPTION OF THIS INVENTION

This invention is based upon the task of avoiding the above-stated prior art difficulties and of developing a method and an arrangement apparatus suitable for tuning the frequency of monochromatic light, for example, laser radiation, avoiding a directional alteration and a parallel displacement of the beam. Furthermore, the apparatus arrangement should operate over the entire spectrum from UV to the far IR.

It has been shown that this task can be solved in a technically advanced manner if the apparatus arrangement comprises two stationary mirrors and two moving mirrors wherein the moving mirrors are arranged symmetrically about their axis of rotation and staggered at a fixed angle of 180° on a rotating support.

The method of this invention is characterized in that:

the beam is reflected back and forth between two locally fixed mirrors via two moving mirrors, wherein the moving mirrors are arranged symmetrically about their axis of rotation and staggered at a fixed angle of 180°, the directional alteration of the beam associated with the reflection from the first moving mirror thus being compensated by the reflection from the second moving mirror opposite the common axis of rotation, the beam direction is reversed at the subsequent stationary mirror and the beam traverses the apparatus arrangement now in opposite direction, the beam finally hits the surface of the second stationary mirror without a lateral parallel displacement and with unchanged direction and the beam is reversed again upon reflection, this procedure being repeated for a sufficient number of light passages before the beam is coupled out of the apparatus arrangement in the known manner.

A further embodiment for the solution of the problem according to this invention is:

Method for frequency shifting a monochromatic narrow-band light beam, in particular a laser beam, based upon the Doppler effect due to reflection at moving mirrors, characterized in that: the beam is reflected back and forth between two moving mirrors via two stationary mirrors or several symmetrically arranged pairs of stationary mirrors, the stationary mirrors of a pair of mirrors are staggered at an angle of 180° and arranged symmetrically about an axis, such that changes in beam direction due to the reflection at the first stationary mirror are compensated for by the reflection at the second stationary mirror opposite the axis of symmetry, the beam direction is reversed at the subsequent moving mirror upon reflection, the beam traversing the arrangement in opposite direction until after reflection at the two stationary mirrors hits an additional moving mirror without lateral parallel displacement and change in beam direction where its direction is again reversed, this process being repeated, and the beam is coupled out of the arrangement in conventional manner after a sufficient number of round trips.

Accordingly a directional alteration is compensated at a second mirror turned by the same angle, and the parallel displacement is eliminated by the inversion of the beam path. The beam may traverse the system repeatedly, resulting in a large frequency shift from this correspondingly increased Doppler effect.

According to one embodiment of the invention both the stationary and the moving mirrors may be plane. It is also possible, however, that the stationary mirror at the entrance of the system is of spherical shape with a radius of curvature larger than or equal to the longest distance the light beam has to travel between the two stationary mirrors at the various positions of the moving mirror.

This apparatus arrangement is particularly suited for frequency shifting the radiation of pulsed lasers. In the case of a pulse sequence the rotation of the two moving mirrors and the repetition rate, as well as the time of the laser emission, have to be synchronized appropriately.

For frequency shifting of continuous wave laser beams another embodiment of this invention is preferred. In this case the moving mirrors are curved according to the equation:

$$\phi = -\arccos\frac{e}{r} + \sqrt{\frac{r^2}{e^2} - 1} + \frac{r}{e} - 1 \quad (1)$$

wherein:
e is the distance of the beam from the center of rotation or the center of symmetry;
r is the distance between the axis of rotation and the point of reflection at the moving mirror (radius vector:)
$\phi$ is the angle between the straight line between the center to the vertex of the curve and radius vector r.

In this embodiment the stationary mirrors are arranged along the light path:
either outside that part of it which is located between the points where the tangents contact the circle of radius e; or
on the tangent between the point of reflection at the moving mirror and the point of contact with the circle of radius e.

In the latter case plane mirrors as well as spherical concave mirrors may be used. The sperical concave mirrors have radii of curvature larger than the distance between the stationary mirrors and the center measured along the light path.

In all cases spherical mirrors can be used with different radii of curvature parallel and perpendicular to the plane of rotation if simultaneously the stability criterion for optical resonators is satisfied ["Laser", Kleen/-Müller, (1069), Springer-Verlag, Berlin, Heidelberg, New York, 49-86].

According to a special embodiment of this invention, two, three or in general n pairs of mirrors can be used instead of only one pair of moving mirrors. They have to be arranged symmetrically about a common axis of rotation. Adjacent pairs of mirrors are staggered by an angle of 180°/n to reflect the beam successively by each pair of mirrors during the rotation.

In an apparatus arrangement with one or several pairs of mirrors curved according to the above equation, with stationary mirrors situated within the beam path on the tangent between the point of reflection at the moving mirror and the point of contact with the circle of radius e, it is also possible to use the stationary mirrors as moving mirrors and conversely. In this case an additional rotating mirror is provided on the axis of rotation to enable the introduction of the beam into the system along the axis of rotation in the known manner.

This means that only two smaller mirrors have to be rotated on a circle of smaller radius.

DETAILED DESCRIPTION OF THIS INVENTION

Further characteristics, advantages and applications of this invention are given in the following description of further details and in the attached drawings.

In the drawings:

FIG. 1 is a schematic of the apparatus arrangement according to this invention with one moving pair of plane mirrors and a stationary pair of plane mirrors, preferably for frequency shifting the emission of pulsed lasers;

FIG. 2 is a schematic of the embodiment with several pairs of mirrors curved according to equation (1), preferably suited for frequency shifting the emission of cw lasers and;

Figure 3:
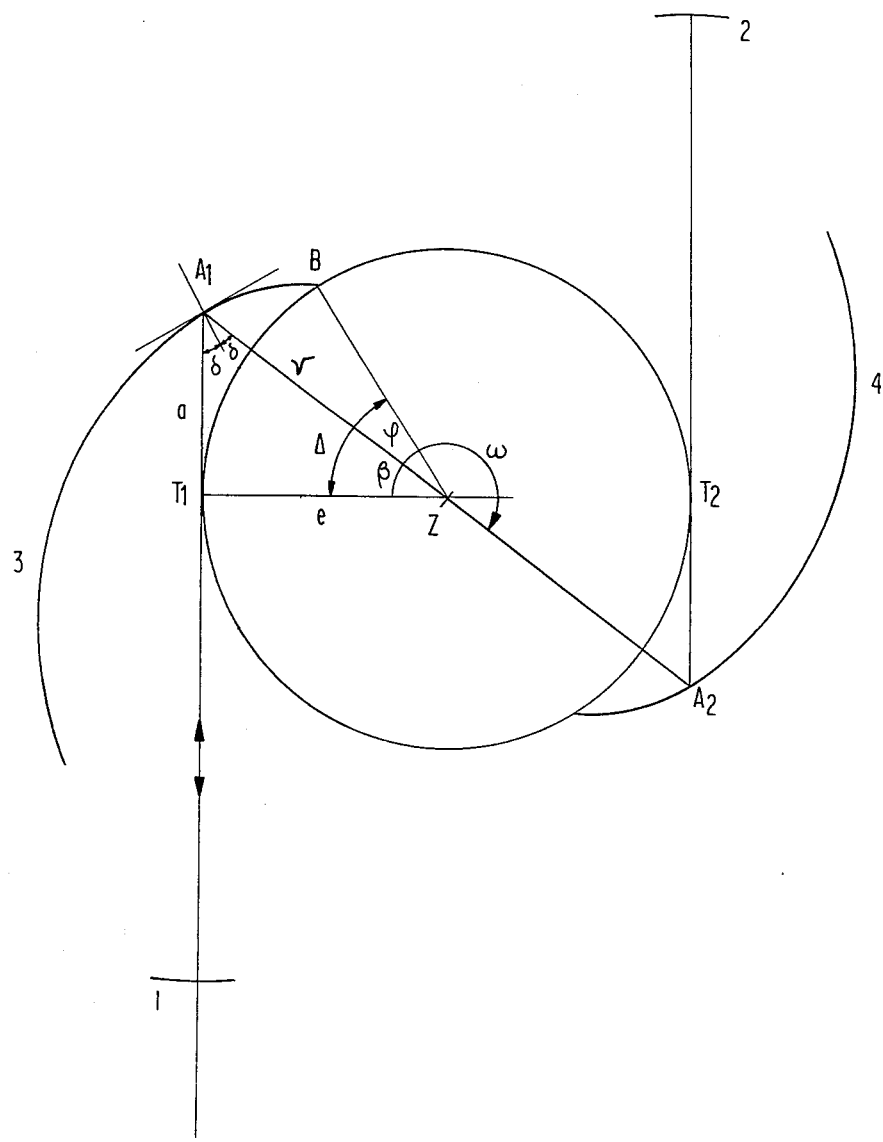
FIG. 3 is a drawing of the reflection properties and the beam path in the case where mirrors of curvature according to equation (1) are used.

According to FIG. 1 the laser beam is reflected back and forth between two fixed mirrors 1 and 2 via two moving mirrors 3 and 4 arranged symmetrically on rotary table 5. The beam can enter and leave the system above or below mirror 1. If the two fixed mirrors are slightly tilted against each other the laser beam leaves the resonator after a certain number of reflections. It is possible to let the beam enter and leave the system only above mirror 1.

The exact position of the rotating mirrors is irrelevant. After a small rotation in the direction of the drawn arrow the beam reflected from mirror 1 will hit mirror 3 slightly displaced to the left resulting in a stronger deflection downwards. After subsequent reflection on the left side of mirror 4 the change of the angle of reflection is compensated. The rotation of both mirrors 3 and 4 merely causes a parallel displacement of the beam at the side of mirror 2. At mirror 2 the beam is reflected collinearly, the direction of the beam being reversed. At the side of mirror 1 no parallel displacement and no directional change is observed.

This apparatus arrangement is very simple and requires only small plane mirrors. Such mirrors can be manufactured with ultimate precision and are available with highly reflecting coatings. Assuming a loss of 0.5 percent for each reflection and N=20 round trips in the system, the total transmission is still well above 50 percent.

The Doppler shift can be calculated using the equation:

$$\Delta\nu/\nu = v/c = (4\omega Nd \cos\alpha)/c, \quad (2)$$

wherein:
$\Delta\nu$ is the frequency shift;
$\nu$ is the frequency of laser beam;
v; speed of rotation;
c is the velocity of light;
$\omega$ is the angular velocity;
N is the number of round trips;
d is the distance between the planes in which the moving mirrors are arranged; and
$\alpha$ is the angle between the beam path and the plane of a moving mirror.

For 1000 rotations per second and with $\omega = 2\pi \cdot 1000$, $d = 10 \cdot \sqrt{2}$ cm corresponding to a mirror distance of 20 cm and $\alpha=45°$, the frequency shift at $\lambda=10$ μm amounts to $\Delta\nu=5$ GHz. Tolerating losses up to 70 percent (40 round trips in the resonator), a frequency shift of 10 GHz can be achieved.

The described apparatus arrangement according to this invention may be considered as a Fabry-Perot-resonator with a deflected light path. Such a resonator with plane parallel mirrors is at the margin of the stability range of optical resonators. A stable resonator exhibiting particularly low diffraction losses may be obtained by replacing plane mirror 1 by a spherical mirror with a radius of curvature by a factor of A larger than the distance between mirrors 1 and 2. With a view to small diffraction losses a value of A between 1.1 and 4 is particularly advantageous.

The apparatus arrangement described can also be used for frequency shifting a beam of a cw laser. Then, however, the Doppler frequency is changed according to equation (2), proportional to the cosine of the angle $\alpha$. Due to the change of the angle of reflection the laser beam reflected from mirror 3 will not hit mirror 4 after a certain rotation. For this reason part of the continuous power is lost even if several moving pairs of mirrors are used in staggered arrangement.

This disadvantage can be overcome by using curved mirrors instead of plane mirrors. Surprisingly it has turned out that mirror surfaces for moving mirrors 3 and 4 may be constructed which are characterized by the features the Doppler effect remains constant, independent of the position, the beam always traverses the center of symmetry Z of the arrangement (no parallel displacement at mirror 4), the center of symmetry is imaged onto a fixed point in both directions independent of the angle of rotation and without a directional change. For technical reasons—to facilitate the use of small mirrors 3 and 4—it is advisable to arrange at least two, preferably three, staggered pairs of mirrors on the rotating table which can act as reflectors successively. Such an apparatus arrangement is shown in FIG. 2.

The equation of the curvature of the mirror is obtained from a differential equation in polar coordinates as follows:

$$\phi = -\arccos\frac{e}{r} + \sqrt{\frac{r^2}{e^2} - 1} + \frac{r}{e} - 1. \qquad (1)$$

In this context reference is made to FIG. 3.

If $\Delta=\beta+\phi$ denotes the angle of rotation when the vertex of the curve moves from T to B, then:

$$\Delta\cdot e = a + r - e. \qquad (3)$$

This means that the circular arc connecting $T_1$ and B is equal to section a of the tangent plus the section $r-e$ of the secant. The light path outside the circle is equal to the associated circular arc and thus increases linearly with the angle of rotation (constant Doppler effect).

If R denotes the radius of curvature of the mirror curve, then the image of the center Z in the direction of mirror 1 is not determined by the focal length R/2 but by $f=R\cdot(\cos\delta)/2$ because of the inclined reflection. One obtains:

$$f = r/(1 + \frac{r}{a}). \qquad (4)$$

For the image distance b follows from $(1/b)+(1/r)=(1/f)$ that $b=a$. The center Z is thus, independent of the position of mirror curve 3, always imaged onto the tangent contact point T. A bi-concentric resonator is obtained if plane mirrors 1 and 2 are inserted at $T_1$ and $T_2$. Regarding the cylindrical symmetry the resonator is stable in accordance with the resonator theory if the plane mirrors are slightly displaced towards $A_1$ or $A_2$ or if two spherical concave mirrors 1 and 2 are used with radii of curvature larger than the distance to the center Z measured along the beam path.

In a system as shown in FIG. 2 the laser beam may enter the resonator above mirror 1 almost touching it if the system is open at one side. Otherwise the beam has to be coupled in along the axis using two path-folding mirrors in the conventional manner.

In the latter case there is also the possibility of keeping the system of mirrors 3 through 8 fixed while both plane mirrors 1 and 2 rotate about axis Z.

In this case using mirrors with the specified profile the Doppler shift resulting from N round trips and four reflections from the moving mirrors is:

$$\Delta\nu = e\cdot\omega\cdot N\cdot e/\lambda.$$

Assuming only N=10 round trips because of the difficulties involved in the construction of profile mirrors and correspondingly larger losses, the Doppler shift amounts to $\Delta\nu=2.5$ GHz with e=10 cm and $\omega=2\pi\cdot1000$ (1000 Hz).

What is claimed is:

1. Apparatus arrangement for frequency shifting a monochromatic narrow-bandwidth light beam, in particular a laser beam based upon the Doppler effect due to reflection from moving mirrors, characterized in that two stationary mirrors are provided between which the beam is reflected back and forth via two moving mirrors, the moving mirrors being staggered by an angle of 180°, arranged symmetrically on a rotating support and rotating about a common axis of rotation.

2. Apparatus arrangement as claimed in claim 1 characterized in that the stationary and the moving mirrors are plane.

3. Apparatus arrangement as claimed in claim 2 characterized in that the stationary mirror at the beam's entrance is spherical, its radius of curvature being larger than or equal to the longest path the beam has to travel between the two stationary mirrors during the rotation of the moving pair of mirrors.

4. Apparatus arrangement as claimed in claim 1 characterized in that the moving mirrors are curved, the curvature according to the equation:

$$\phi = -\arccos\frac{e}{r} + \sqrt{\frac{r^2}{e^2} - 1} + \frac{r}{e} - 1$$

wherein e is the distance of the beam from the axis of rotation, r is the distance between the axis of rotation and point of reflection of the beam at the moving mirror (radius vector), and $\phi$ is the angle between the straight line from the center Z to the vertex of the curve B, and the radius vector r in FIG. 3.

5. Apparatus arrangement as claimed in claim 4 characterized in that the stationary mirrors are arranged outside of the beam path between the tangent points $T_1$ and $T_2$ in which the light beam contacts the circle of radius e.

6. Apparatus arrangement as claimed in claim 4 characterized in that the stationary mirrors are arranged on the beam path on the tangent between the points of reflection $A_1$ and $A_2$ on the moving mirrors and the points $T_1$ and $T_2$ respectively in which the light beam contacts the circle of radius e.

7. Apparatus arrangement as claimed in claim 6 characterized in that plane mirrors are used as stationary mirrors.

8. Apparatus arrangement as claimed in claim 6 characterized in that spherical concave mirrors are used as stationary mirrors whose radii of curvature are larger than the distance of the stationary mirrors from the axis of rotation measured along the beam path.

9. Apparatus arrangement as claimed in claim 6 characterized in that the stationary mirrors are concave mirrors having different radii of curvature parallel and perpendicular to the plane of rotation such that the stability criterion for optical resonators is satisfied according to the resonator theory.

10. Apparatus arrangement as claimed in claim 6 characterized in that n pairs of moving mirrors instead of one pair of mirrors are used, staggered symmetrically about the axis of rotation by an angle of 180°/n such that the beam hits each of the pairs successively during the rotation.

11. Apparatus arrangement for frequency shifting a monochromatic narrow-band light beam, in particular a laser beam, based upon the Doppler effect due to reflection at moving mirrors characterized in that by reversing the apparatus arrangement as claimed in claim 10 the previously stationary mirrors are arranged to rotate about an axis while the previously moving mirrors are now stationary; at the axis of rotation an additional mirror is provided to enable the introduction of the beam into the system along the axis of rotation in the conventional manner.

12. Apparatus arrangement as claimed in claim 11 characterized in that the frequency shifting device is used in the inner beam path of a laser.

13. Apparatus arrangement as claimed in claim 1 characterized in that the stationary mirror at the beam's entrance is spherical, its radius of curvature being larger than or equal to the longest path the beam has to travel between the two stationary mirrors during the rotation of the moving pair of mirrors.

14. Apparatus arrangement as claimed in claim 1 characterized in that the moving mirrors are curved, the curvature according to the equation:

$$\phi = -\arccos\frac{e}{r} + \sqrt{\frac{r^2}{e^2} - 1} + \frac{r}{e} - 1$$

wherein e is the distance of the beam from the axis of rotation, r is the distance between the axis of rotation and point of reflection of the beam at the moving mirror (radius vector), and $\phi$ is the angle between the straight line from the center Z to the vertex of the curve B, and the radius vector r in FIG. 3.

15. Apparatus arrangement as claimed in claim 1 characterized in that the stationary mirrors are arranged outside the beam path between the tangent points $T_1$ and $T_2$ in which the light beam contacts the circle of radius e.

16. Apparatus arrangement as claimed in claim 1 characterized in that the stationary mirrors are arranged on the beam path on the tangent between the points of reflection $A_1$ and $A_2$ on the moving mirrors and the points $T_1$ and $T_2$ respectively in which the light beam contacts the circle of radius e.

17. Apparatus arrangement as claimed in claim 16 characterized in that plane mirrors are used as stationary mirrors.

18. Apparatus arrangement as claimed in claim 16 characterized in that spherical concave mirrors are used as stationary mirrors whose radii of curvature are larger than the distance of the stationary mirrors from the axis of rotation measured along the beam path.

19. Apparatus arrangement as claimed in claim 1 characterized in that the stationary mirrors are concave mirrors having different radii of curvature parallel and perpendicular to the plane of rotation such that the stability criterion for optical resonators is satisfied according to the resonator theory.

20. Apparatus arrangement as claimed in claim 1 characterized in that n pairs of moving mirrors instead of one pair of mirrors are used, staggered symmetrically about the axis of rotation by an angle of 180°/n such that the beam hits each of the pairs successively during the rotation.

21. Apparatus arrangement for frequency shifting a monochromatic narrow-band light beam, in particular a laser beam, based upon the Doppler effect due to reflection at moving mirrors characterized in that by reversing the apparatus arrangement as claimed in claim 1 the previously stationary mirrors are arranged to rotate about an axis while the previously moving mirrors are now stationary; at the axis of rotation an additional mirror is provided to enable the introduction of the beam into the system along the axis of rotation in the conventional manner.

22. Apparatus arrangement as claimed in claim 1 characterized in that the frequency shifting device is used in the inner beam path of a laser.

23. Method for frequency shifting a monochromatic narrow-band light beam based upon the Doppler effect due to reflection at moving mirrors characterized in that the beam is reflected back and forth between two stationary mirrors via two moving mirrors, the latter being arranged symmetrically around the axis of rotation and staggered at an angle of 180°, changes in the beam direction due to the reflection at the first moving mirror are compensated for by the reflection at the second moving mirror opposite the common axis of rotation, the beam direction is reversed upon reflection at a subsequent second stationary mirror, the beam traversing the arrangement in the opposite direction so that there is no lateral parallel displacement at the first stationary mirror, at which the beam direction is again reversed, this process is repeated and the beam is coupled out in the conventional manner of the arrangement after a sufficient number of round trips.

24. Method as claimed in claim 23 characterized in that the frequency shifting device is used in the inner beam path of a laser.

25. Method for frequency shifting a monochromatic narrow-band light beam based upon the Doppler effect due to reflection at moving mirrors, characterized in that the beam is reflected back and forth between two moving mirrors via two stationary mirrors or several symmetrically arranged pairs of stationary mirrors, the stationary mirrors of a pair of mirrors are staggered at an angle of 180° and arranged symmetrically about an axis, such that changes in beam direction due to the reflection at the first stationary mirror are compensated for by the reflection at the second stationary mirror opposite the axis of symmetry, the beam direction is reversed at the subsequent moving mirror upon reflection, the beam traversing the arrangement in opposite direction until after reflection at the two stationary mirrors hits an additional moving mirror without lateral parallel displacement and change in beam direction where its direction is again reversed, this process being repeated, and the beam is coupled out of the arrangement in conventional manner after a sufficient number of round trips.

26. Method as claimed in claim 25 characterized in that the frequency shifting device is used in the inner beam path of a laser.

* * * * *